No. 771,416. PATENTED OCT. 4, 1904.
F. A. BROWNELL.
PHOTOGRAPHIC ROLL HOLDER CAMERA.
APPLICATION FILED JAN. 12, 1903.
NO MODEL. 5 SHEETS—SHEET 1.
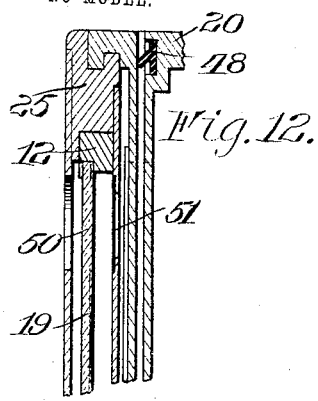
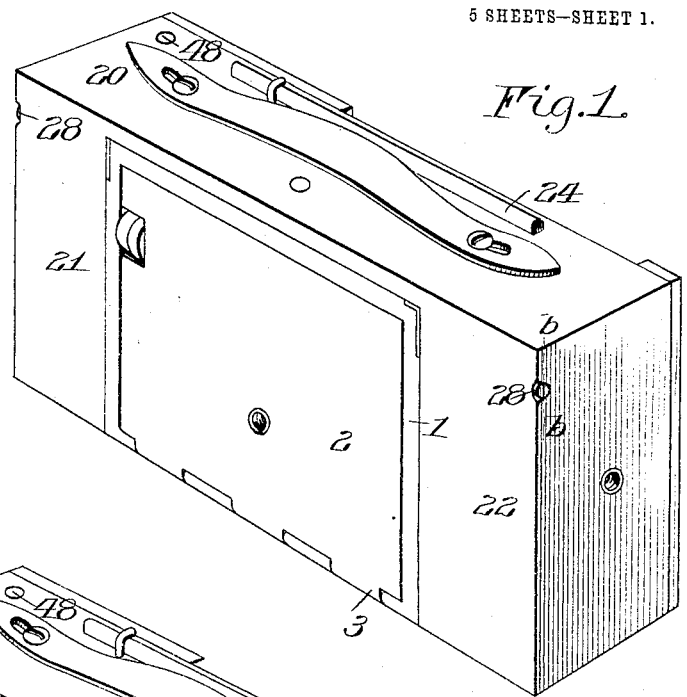
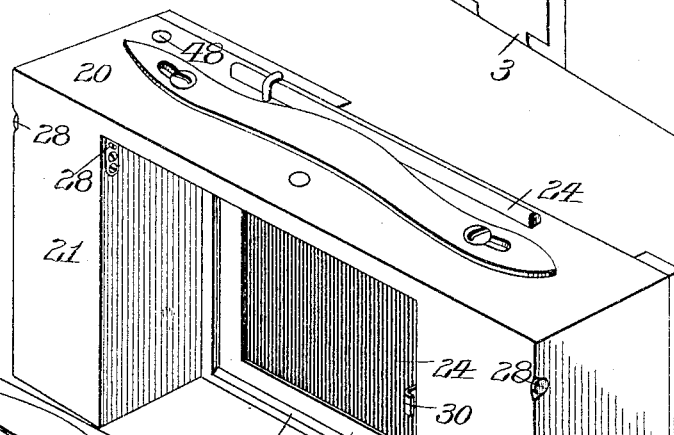
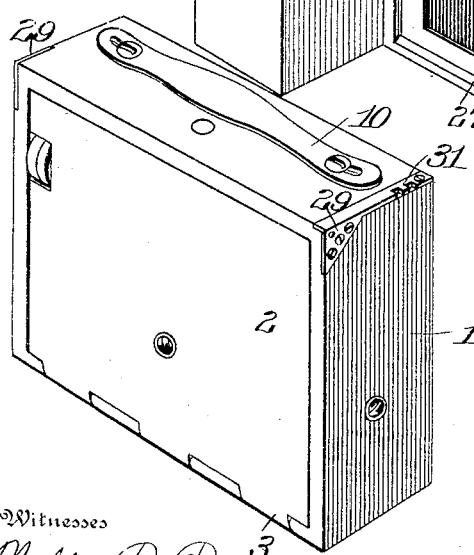
Witnesses
Walter B. Payne
L. Willard Rich
Inventor
Frank A. Brownell
by Frederick S. Church
his Attorney No. 771,416. PATENTED OCT. 4, 1904.
F. A. BROWNELL.
PHOTOGRAPHIC ROLL HOLDER CAMERA.
APPLICATION FILED JAN. 12, 1903.
NO MODEL. 5 SHEETS—SHEET 2.
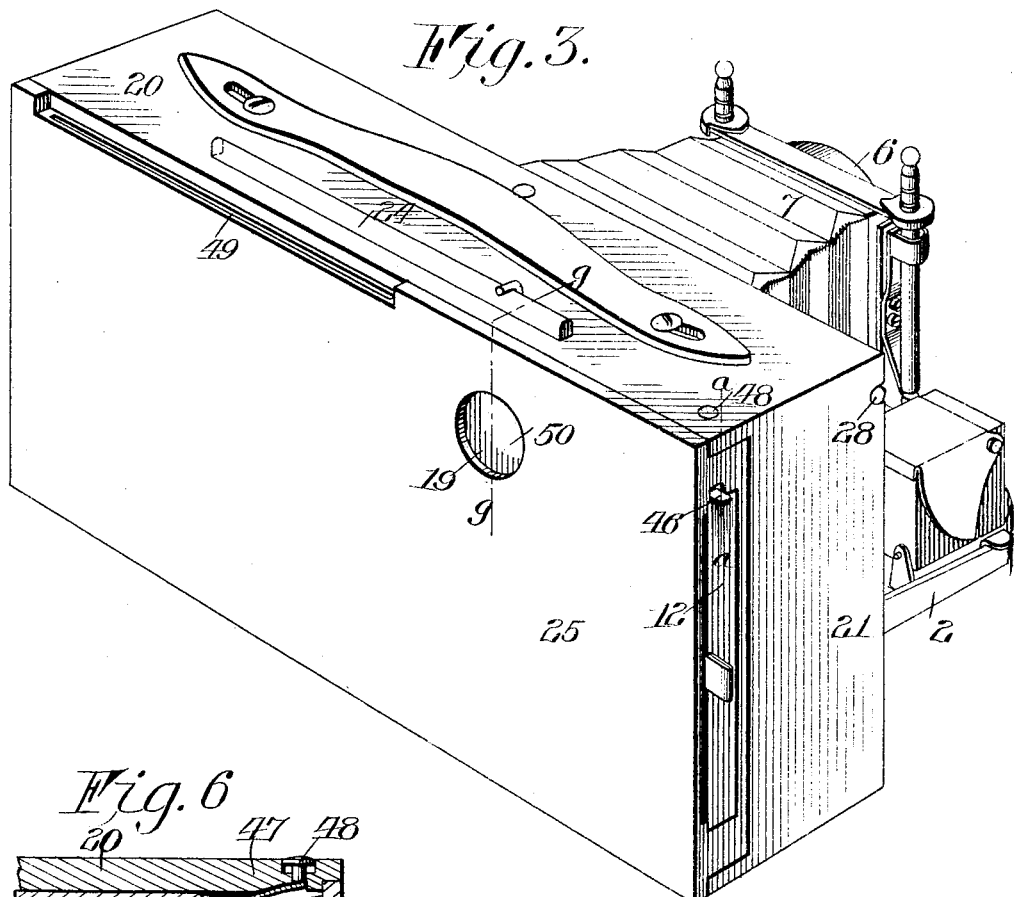
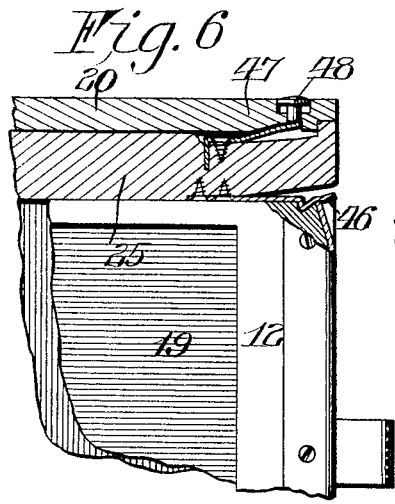
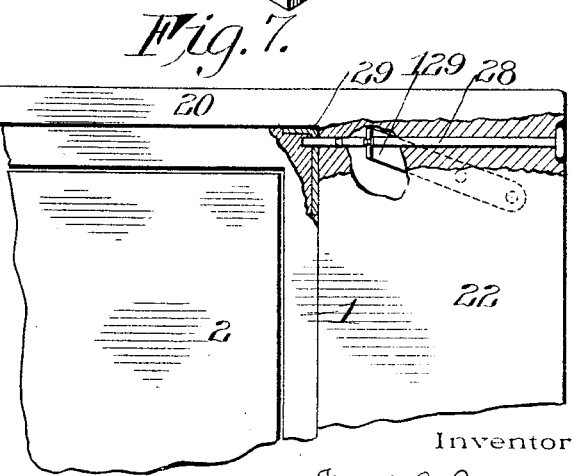
Witnesses.
Walter B. Payne.
G. Willard Rich.
Inventor.
Frank A. Brownell
by Frederick F. Church
his Attorney

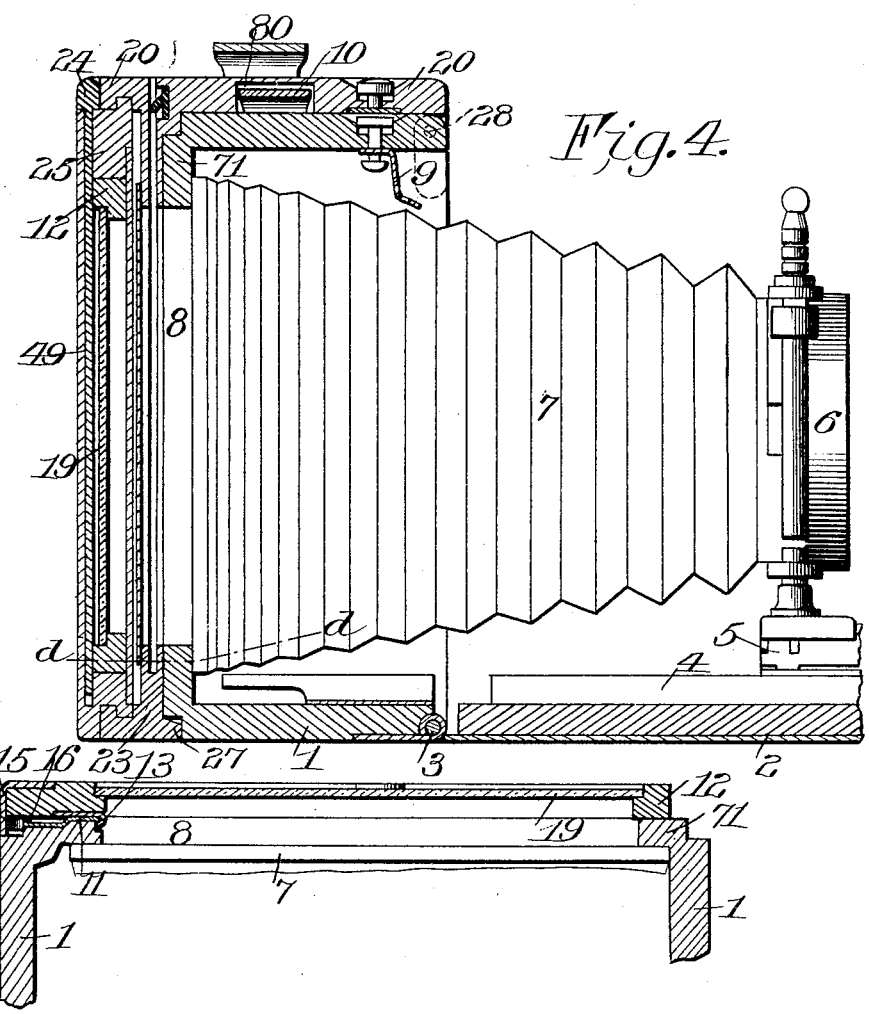

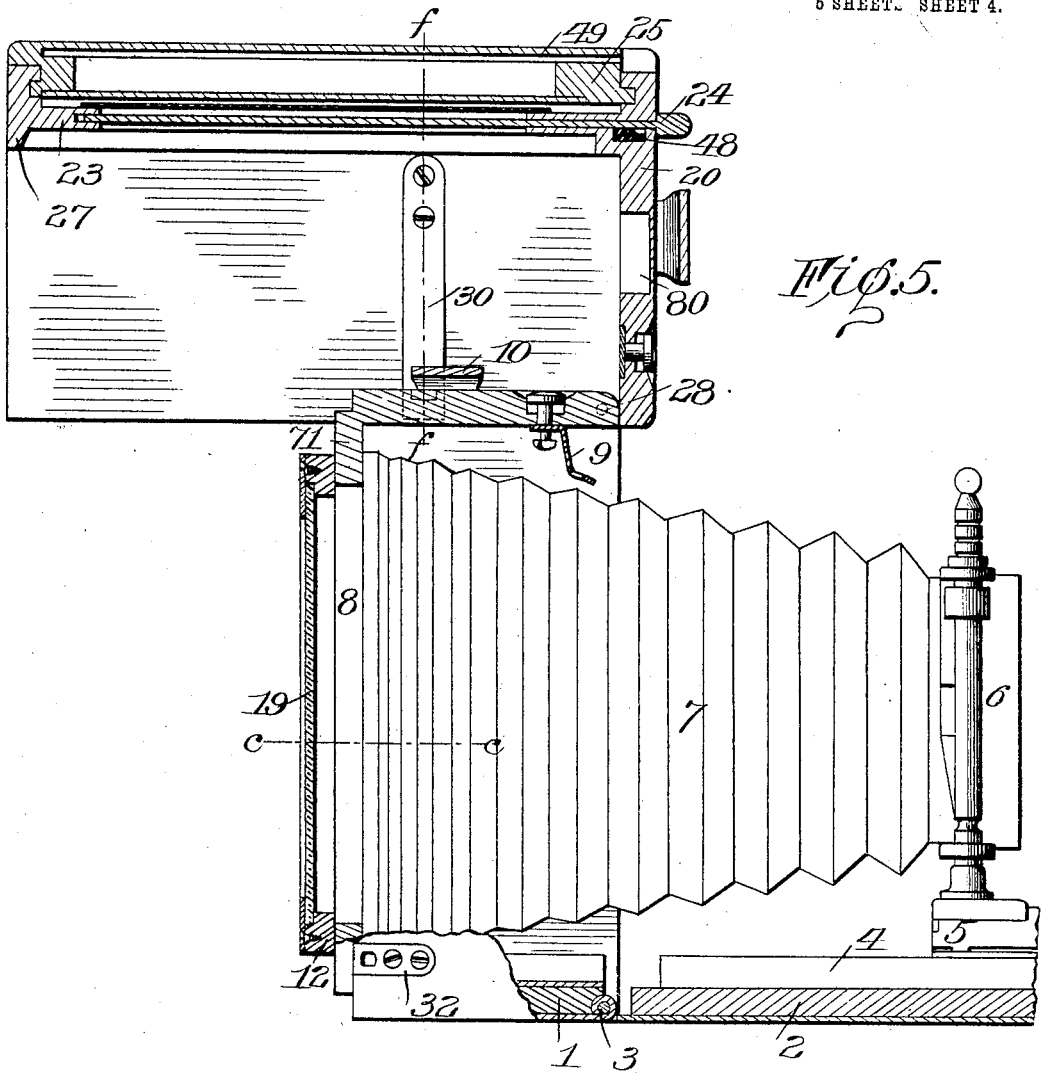

No. 771,416. PATENTED OCT. 4, 1904.
F. A. BROWNELL.
PHOTOGRAPHIC ROLL HOLDER CAMERA.
APPLICATION FILED JAN. 12, 1903.
NO MODEL. 5 SHEETS—SHEET 5.

Witnesses.
Walter B. Payne
G. Willard Rich

Inventor.
Frank A. Brownell
by Frederick L. Church
Attorney

No. 771,416.                                                                    Patented October 4, 1904.

UNITED STATES PATENT OFFICE.

FRANK A. BROWNELL, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC ROLL-HOLDER CAMERA.

SPECIFICATION forming part of Letters Patent No. 771,416, dated October 4, 1904.

Application filed January 12, 1903. Serial No. 138,636. (No model.)

*To all whom it may concern:*

Be it known that I, FRANK A. BROWNELL, of Rochester, in the county of Monroe and State of New York, have invented certain new and useful Improvements in Photographic Roll-Holder Cameras; and I do hereby declare the following to be a full, clear, and exact description of the same, reference being had to the accompanying drawings, forming a part of this specification, and to the reference-numerals marked thereon.

My present invention relates to photographic cameras, and particularly to film-roll holders therefor, and has for its object to provide a roll-holder which may be moved into position on the camera for use and may be moved out of position to permit the application of a focusing-screen or an ordinary plate-holder, and, further, to provide means for preventing exposure of the film in the holder when moved away from the camera.

To these and other ends the invention consists in certain improvements and combinations of parts, all as will be hereinafter fully described, and the novel features pointed out in the claims at the end of the specification.

Figure 9:
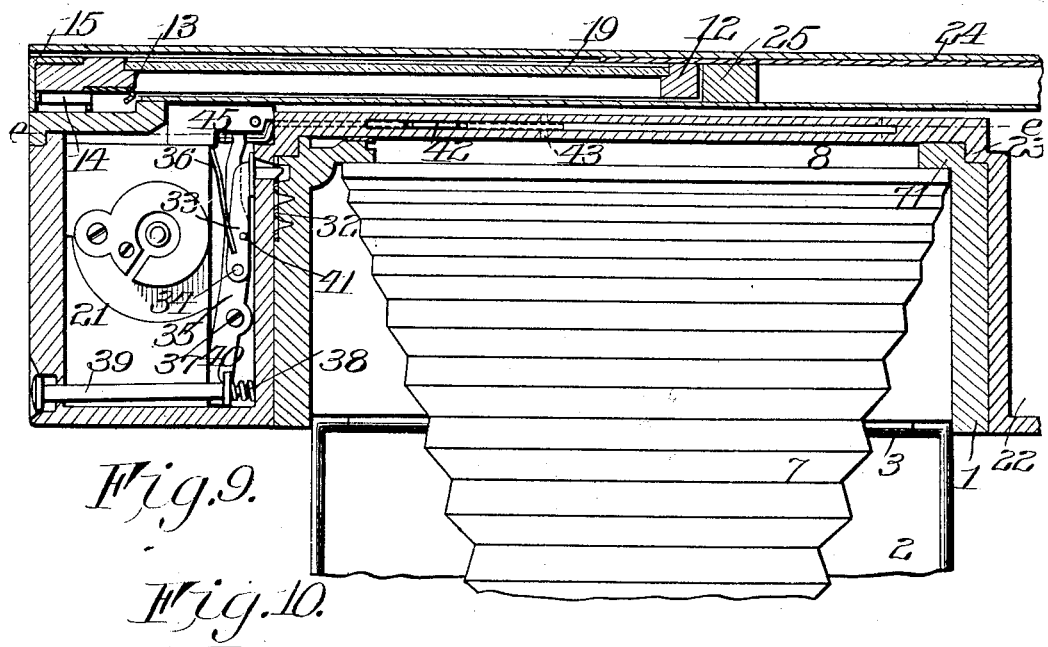

In the accompanying drawings, Figure 1 is a perspective view of a folding camera and roll-holder when closed, Fig. 2 a similar view with the holder removed from the camera. Fig. 3 is a perspective view, looking from the rear of the roll-holder, embodying my improvements applied to a folding camera, the latter being shown in the extended position. Fig. 4 is a longitudinal vertical sectional view of the same with the roll-holder in position for use. Fig. 5 is a similar view with the roll-holder swung up out of operative position and a focusing-screen in position for use. Fig. 6 is a sectional view on the line *a a* of Fig. 3, Fig. 7 a sectional view on the line *b b* of Fig. 1. Fig. 8 is a sectional view on the line *c c* of Fig. 5. Fig. 9 is a horizontal sectional view on the line *d d* of Fig. 4, Fig. 10 a vertical sectional view on the line *e e* of Fig. 9. Fig. 11 is a rear elevation of the holder and camera when in the position shown in Fig. 5, with parts shown in section on the line *f f* of said figure; Fig. 12, a sectional view on the line *g g* of Fig. 3.

Similar reference-numerals in the several figures indicate similar parts.

The camera proper, to which my improved holder is shown applied, may be of any approved construction, preferably embodying a main frame or casing (indicated by 1) having the lid or door 2 hinged at 3 and adapted to fold up to form a closure for the contained parts, a way 4 being arranged in the casing and upon the door 2 on which is adapted to travel the block or carriage 5, carrying the camera-front 6, connected by the usual bellows 7 with the rear frame 71 of the casing in which the exposure-opening 8 is provided as usual. The door 2 is adapted to be secured in closed position by a suitable catch, as 9, and the frame and the outer side of the door are covered with leather or other suitable covering material, the top being provided with a handle 10, so that the camera itself forms a separate structure which may, if desired, be used in connection with any form of focusing-screen or plate-holder. In the present instance, however, I provide at the edge of the opening 8 in the casing a metal plate 11, to which is adapted to be applied a removable focusing-screen embodying a frame 12 and ground glass 19, having at one edge a catch-plate 13, adapted to coöperate with the plate 11. A spring 14 is secured at its middle to a flange 15 on the screen-frame, having its free ends arranged to engage the shoulder 16 and serving to operate the screen or glass frame outwardly or in a direction to secure the engagement of the plates 11 and 13, holding the focusing-screen firmly in place.

The roll-holder which is used in connection with this camera or any other of a size fitted to it and which forms the principal subject-matter of this application embodies a top board 20, (having the recessed portion 80 for the handle of the camera,) at the ends of which are arranged depending casings or spool-holding chambers, (indicated by 21 and 22,) the former being adapted to contain the spool of unexposed film and the latter the reel or winding-spool, as will be explained. The space between the inner sides of the two spool-chambers is equal to the width of the frame 1 of the camera, and the exterior surface of the chambers and of the top board are preferably covered with the same kind of material as the exterior of the door 2 and the bottom of the frame 1, so that when the holder is in place upon the camera the parts have the appearance of being a single structure, as shown in Fig. 1, the front of the door 2 being flush with the front faces of the chambers. Extending between the film-chambers 21 and 22 at the rear side is a frame 23, having a central aperture adapted to be closed by the usual cover-slide 24, which is inserted from the top, said frame forming, with the exterior slide or cover 25, a closed film-passage leading from one film-chamber to the other. At the edges of the film-chambers are arranged the usual rollers 26, over which the film extends, and within the chambers are arranged the spool centering and winding devices of any usual or preferred construction. The roll-holder casing is open at the bottom between the two film-chambers, the lower edge being rabbeted, as shown at 27, Fig. 4, and at the forward upper corners of the camera-casing 1 are arranged pivotal connections with the roll-holder frame. In the present instance these consist of movable pins 28, passing through the material of the roll-holder and adapted to enter apertures formed in plates 29, arranged in the upper forward corners of the camera-body, these pins 28 being longitudinally adjustable and forming a detachable hinged connection with the camera, being retained in either projected or retracted position by means of a leaf-spring 129, the end of which engages with suitable notches formed in the pins, as shown particularly in Fig. 7. This hinged connection permits the holder to be turned in the position shown in Fig. 5, where it is out of the way, although sustained by the camera, permitting the use of the focusing-screen, and the holder is adapted to be maintained in the position shown in Fig. 5 by a suitable catch—such, for instance, as the spring 30—secured to the inside of the roll-holder, and having a recess at its end adapted to engage a projection formed in a plate 31 on the upper corner of the camera, as shown particularly in Figs. 5 and 11. The roll-holder is firmly secured when swung down into the operative position, as shown in Fig. 4, by a suitable securing device therein, coöperating with a recess in the catch-plate 32, arranged at the lower corner of the camera. This securing device consists of a catch 33, having a beveled end projecting into the space between the film-chambers and adapted to coöperate with the plate 32, said catch being pivoted at 34 upon an operating-lever 35 and being projected outwardly by a spring 36, engaging a shoulder in the casing and permitted to yield independently of the lever to engage the camera. The lever 35 is in turn pivoted at 37 and is moved laterally by a spring 38, a push-rod 39 coöperating with a lug 40 on the lever 35 and having its head or end extending to the exterior of the casing, where it is adapted to be operated upon by the user's finger when it is desired to release the catch 33. The connection between the lever 35 and the catch 33 is formed by a pin 41, secured to the former and operating in a slot in the catch, so that while the lever 35 may be moved on its pivot by the pin 39 to disengage the catch the latter is permitted a movement independent of the lever, so that when the holder is swung down it may engage the camera and become locked without necessarily moving the lever 35.

Figure 10:
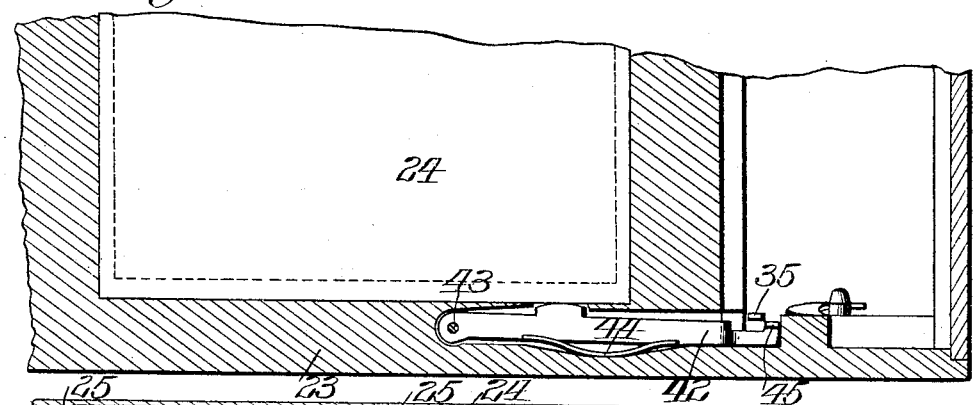
Figure 11:
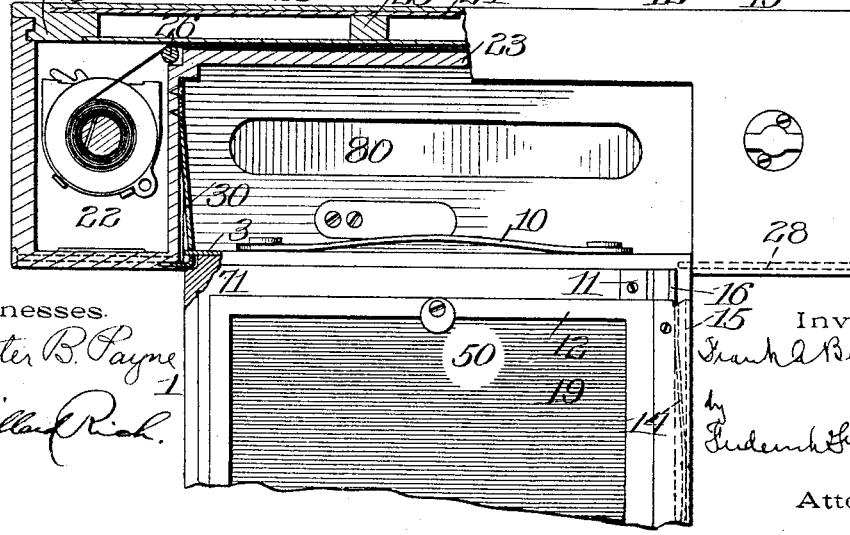

In a roll-holder employing a movable slide for covering the exposing-aperture during the focusing operation it is desirable to provide means for preventing the movement of the holder when the slide is not in position to cover the film, and for this purpose I provide a locking device between the slide and the securing-catch, formed in the present instance by extending the end of the lever 35 to the rear of the holder-casing and providing a catch-lever 42, pivoted at 43 and operated upon by the spring 44, the end of said lever having a projection 45, adapted when the end of the lever is raised to pass in the rear of the lever 35, controlling the catch 33, and a portion of the lever 42 extends upwardly and into the slot or passage for the covering-slide 24, as shown in Figs. 9 and 10, the construction being such that when the slide is removed the lever 42 will be raised, preventing the disengagement of the holding-catch for the roll-holder; but when said slide is in position, as shown in Fig. 10, its engaging end is moved out of the path of the lever 35, which may be then operated to permit the raising of the holder.

The slide or door 25, forming the rear cover for the passage extending between the film-chambers, is guided to move longitudinally on the top and bottom boards of the roll-holder casing and is recessed for a portion of its length and of sufficient thickness to form a chamber for the reception of the focusing-screen frame 12, which may be slid longitudinally into the end thereof, as shown in Figs. 3, 4, 6, and 9, and secured in position by a suitable spring-catch 46, the slide or cover 25 being secured by a spring-catch 47, adapted to be released by the button 48 on the top board 20 and secured by the covering material at the exterior of the holder.

When the slide 24 is withdrawn from the holder, the passage therefor is closed by the usual light-excluding strip 48, and the slide itself is inserted in the pocket or receptacle 49, formed in the rear slide or cover 25. (See Figs. 3 and 4.) As the spool winding and centering devices may be of any desired construction I have not deemed it necessary to show or describe them specifically herein.

The roll-holder being particularly adapted for using film-cartridges has arranged in the door at its rear side an aperture preferably covered with ruby glass 51, through which the usual markings on the back of the film-covering of opaque paper may be viewed, and as in the present instance the ground glass or focusing screen is interposed between the film and the exterior of the holder I render a portion of the focusing-screen (indicated by 50) transparent to permit inspection of the indications on the film-covering through the aperture, as shown in Fig. 11.

When the camera is closed and in position within the casing of the roll-holder, as in Fig. 1, the structure as a whole is of rectangular form and does not differ essentially in appearance from an ordinary camera and when separated from the roll-holder and used with plate-holders in the usual manner.

I claim as my invention—

1. The combination with a photographic camera embodying a casing, of a roll-holder containing film-holding chambers a passage between them and a cover for the latter, said roll-holder being hinged to the camera to swing bodily into and out of coöperative relation with the rear thereof.

2. The combination with a photographic camera embodying a casing, of a roll-holder containing film holding and winding spools, said roll-holder being hinged to the camera-casing and adapted to swing inwardly into coöperative relation with the rear thereof and outwardly to permit access to the casing, and a catch for retaining the holder in the open position.

3. The combination with a photographic camera embodying a casing, of a roll-holder arranged exteriorly of the camera-casing and hinged to the upper portion thereof and movable into and out of coöperative relation with the rear of said casing and devices for securing the holder in raised or lowered position.

4. The combination with a photographic camera embodying a casing, of a roll-holder arranged exteriorly of the camera-casing and hinged to the upper portion of the casing and embodying film-chambers arranged on opposite sides of the camera-casing and a connecting portion containing a film-passage with a front opening extending between said chambers and adapted to coöperate with the rear of the camera when swung down, said holder being adapted to be swung up to permit access to the rear of the camera and means for sustaining the holder in raised position.

5. The combination with a photographic camera embodying a casing, a front door and an extensible lens-carrier, of a roll-holder hinged to the upper portion of said casing and embodying film-chambers arranged at the sides thereof and a connecting portion having a film-passage and a front opening adapted to coöperate with the rear of the casing when in lowered position, said holder being adapted to be swung up on its hinges to permit access to the rear of the camera and means for securing said holder in raised and lowered position.

6. The combination with a photographic camera embodying a casing, a front door and an extensible lens-carrier, of a roll-holder hinged to the upper forward portion of the casing and embodying a top board, film-chambers arranged at the sides of the camera and a connecting portion having a film-passage and a front opening adapted to coöperate with the rear of the casing when in lowered position, said holder being adapted to be swung up on its hinges to permit access to the rear of the camera, means for securing the holder in its raised position away from the camera-back and separate means for securing it in lowered position in engagement therewith.

7. The combination with a camera, a holder for sensitized material adapted to be applied thereto having an exposing-aperture and a cover therefor, of a device for securing the holder to the camera with its aperture in coöperative relation with the latter and connections between said securing device and the holder-cover permitting disengagement of the former only when the aperture is closed.

8. The combination with a camera, a holder for sensitized material adapted to be applied thereto having an exposing-aperture and a cover therefor, of an automatically-engaging catch for securing the holder to the camera with its aperture in coöperative relation with the latter, and means operated by the holder-cover for controlling the operation of said catch.

9. The combination with a camera, of a holder for sensitized material connected thereto, having an exposing-aperture and adapted to be moved on the camera without disconnection therefrom to bring the exposing-aperture into and out of coöperative relation with the camera back, a cover for the said aperture and means for securing the holder on the camera-back and controlled by the aperture-cover.

10. The combination with a camera and a movable holder for sensitized material connected thereto and coöperating with the rear thereof and having an exposing-aperture and a cover therefor, of a catch for securing the holder to the camera and a locking device preventing the operation of said catch adapted to be released by the cover when the latter is over the holder-aperture.

11. The combination with a camera and a movable holder for sensitized material connected thereto and coöperating with the rear thereof having the exposing-aperture and a cover therefor, of an automatic catch for securing the holder in coöperative relation with the camera, a release member for actuating the catch, a stop for preventing the operation of the release member controlled by the cover for the exposing-aperture of the holder.

12. The combination with a camera and a holder for sensitized material pivoted thereto having the exposing-aperture and the cover-slide therefor, of the automatic catch for securing the holder in position, the release member therefor operable from the exterior of the holder, and the automatic catch for securing the release member arranged in the path of and operated by the cover-slide.

13. The combination with the camera-casing, of a roll-holder embodying the film-chambers arranged at opposite sides of the camera-casing and connected by a film-passage, detachable pivotal connections between the upper forward ends of the holder and the casing, and means for securing the holder in position when turned in two positions on the pivots.

14. In a roll-holder the combination with a casing provided with the film-chambers at opposite sides open at the rear and having a film-passage extending between said chambers formed in part by a connecting portion having an exposing-aperture in the front, and a cover-slide for said aperture, of a removable rear cover for the holder extending over the rear sides of the film-chambers and forming a portion of the film-passage and a pocket formed in said closure for the reception of the cover-slide when removed from the exposing-aperture.

15. In a roll-holder, the combination with a casing provided with the film-chamber at opposite sides open at the rear and having a film-passage extending between said chambers, formed in part by a connecting portion having an exposing-aperture in the front and a cover-slide for said aperture, of a removable cover for the rear of the holder extending over the rear of the film-chambers and forming a portion of the film-passage said cover having an observation-aperture, a pocket formed in said rear cover and a removable focusing-screen arranged in said pocket having a transparent portion adapted to register with the observation-aperture.

16. In a roll-holder, the combination with a casing having film-chambers at opposite sides connected by a film-passage having an observation-aperture in the rear thereof and a pocket formed in rear of the film-passage, of a removable focusing-screen arranged in said rear pocket having a transparent portion adapted to register with the observation-aperture.

17. In a focusing film-camera a section having a bellows and lens associated with the same, a film-holder comprising end roll-holding compartments and a film-passage extending between them having means associated therewith for protecting the film and for exposing the same and a hinged connection between the upper portion of the box-section and the film-holder constructed to permit the film-holder to swing into position in alinement with the lens and into a second position out of alinement therewith.

18. The combination with a photographic camera and a focusing-screen movably connected to the rear thereof, of a film-holder embodying roll-holding compartments, a connecting passage between them and a removable cover for said film-passage, and a hinge connection between said camera and holder permitting the holder to be swung toward and away from the rear of the camera without disconnection therefrom.

FRANK A. BROWNELL.

Witnesses:
G. WILLARD RICH,
ELIZABETH J. PERRY.